(12) United States Patent
Nobori

(10) Patent No.: US 8,520,038 B2
(45) Date of Patent: Aug. 27, 2013

(54) IMAGE DISPLAY APPARATUS, IMAGE DISPLAY METHOD, AND IMAGE SUPPLY APPARATUS

(75) Inventor: Tatsuhiko Nobori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 106 days.

(21) Appl. No.: 13/186,924

(22) Filed: Jul. 20, 2011

(65) Prior Publication Data

US 2012/0019568 A1 Jan. 26, 2012

(30) Foreign Application Priority Data

Jul. 22, 2010 (JP) ................................. 2010-164599

(51) Int. Cl.
*G09G 5/10* (2006.01)
(52) U.S. Cl.
USPC ........................................................ 345/690
(58) Field of Classification Search
USPC ............................ 345/690, 419, 697; 348/51
See application file for complete search history.

(56) References Cited

U.S. PATENT DOCUMENTS

| | | | | |
|---|---|---|---|---|
| 5,764,340 | A * | 6/1998 | Hofeldt | .......................... 351/201 |
| 7,006,125 | B2 * | 2/2006 | Divelbiss et al. | ............... 348/52 |
| 2002/0021292 | A1 | 2/2002 | Sakashita | |
| 2007/0018951 | A1 | 1/2007 | Nobori et al. | |
| 2007/0025683 | A1 | 2/2007 | Nobori | |
| 2007/0285574 | A1 | 12/2007 | Nobori | |
| 2008/0036872 | A1 | 2/2008 | Nobori | |
| 2008/0198327 | A1 * | 8/2008 | Bursov et al. | .................. 351/203 |
| 2009/0265660 | A1 | 10/2009 | Nobori | |
| 2009/0284544 | A1 | 11/2009 | Nobori | |
| 2011/0032340 | A1 * | 2/2011 | Redmann et al. | ................ 348/51 |
| 2011/0193891 | A1 * | 8/2011 | Lee et al. | ....................... 345/690 |
| 2011/0242150 | A1 * | 10/2011 | Song et al. | ....................... 345/697 |
| 2011/0273480 | A1 * | 11/2011 | Park et al. | ....................... 345/690 |
| 2012/0019524 | A1 * | 1/2012 | Nobori | .......................... 345/419 |
| 2012/0194563 | A1 * | 8/2012 | Liang et al. | .................... 345/690 |

FOREIGN PATENT DOCUMENTS

| | | |
|---|---|---|
| JP | 2002-31846 A | 1/2002 |
| JP | 2007-41535 A | 2/2007 |
| JP | 2007-047244 A | 2/2007 |
| JP | 2007-58167 A | 3/2007 |
| JP | 2007-121541 A | 5/2007 |
| JP | 2007-212834 A | 8/2007 |
| JP | 2007-241172 A | 9/2007 |
| JP | 2008-15225 A | 1/2008 |
| JP | 2008-145938 A | 6/2008 |
| JP | 2009-025445 A | 2/2009 |
| JP | 2009-232308 A | 10/2009 |

(Continued)

*Primary Examiner* — Fred Tzeng
(74) *Attorney, Agent, or Firm* — ALG Intellectual Property, LLC

(57) ABSTRACT

A stereoscopic image display apparatus includes an image output unit that outputs right-eye image data and left-eye image data that form stereoscopic image data, a characteristic value calculating unit that calculates brightness-related image characteristic values of at least one of the right-eye image data and the left-eye image data, a expanding coefficient calculating unit that calculates a expanding coefficient common to the right-eye image data and the left-eye image data based on the image characteristic values, a brightness expanding unit that performs brightness expanding on both the right-eye image data and the left-eye image data by using the expanding coefficient, and an image display unit that displays an image based on the right-eye image data and the left-eye image data having undergone the brightness expanding.

8 Claims, 7 Drawing Sheets

(56) References Cited

FOREIGN PATENT DOCUMENTS

| | | |
|---|---|---|
| JP | 2009-276500 A | 11/2009 |
| JP | 2010-55108 A | 3/2010 |
| JP | 2010-204520 A | 9/2010 |
| JP | 2010-210722 A | 9/2010 |
| JP | 2010-211091 A | 9/2010 |
| JP | 2010-217914 A | 9/2010 |
| JP | 2010-244561 A | 10/2010 |
| JP | 2010-256915 A | 11/2010 |

* cited by examiner

IMAGE DISPLAY APPARATUS, IMAGE DISPLAY METHOD, AND IMAGE SUPPLY APPARATUS

The entire disclosure of Japanese Patent Application No. 2010-164599, filed July 22, 2010 is expressly incorporated by reference herein.

BACKGROUND

1. Technical Field

The present invention relates to an image display apparatus, an image display method, and an image supply apparatus.

2. Related Art

In an image display apparatus of related art for displaying an image by using illumination light, it has been known to widen the dynamic range by performing light control in which the amount of illumination light is reduced and the brightness of an image signal to be displayed is amplified (see JP-A-2002-031846, for example).

Further, there has been a known image display apparatus of related art for displaying an image stereoscopically by combining a right-eye image to be viewed with the right eye and a left-eye image to be viewed with the left eye (see JP-A-2009-232308, for example).

When the method of related art disclosed in JP-A-2002-031846 or similar methods of related art disclosed in other documents are used to widen the dynamic range of an image to be displayed stereoscopically, the resultant image causes a viewer to feel a strong sense of discomfort, possibly resulting in decrease in display quality.

That is, in the light control disclosed in JP-A-2002-031846, it is necessary to set a brightness amplification factor and other brightness-related parameters appropriately in accordance with characteristics (such as brightness) of an image to be displayed, and the amplification factor is determined whenever a different image is displayed. In the method for stereoscopically displaying an image disclosed in JP-A-2009-232308, in which it is essential to view different images with the right and left eyes, however, simply using the light control of related art results in discrepancy in brightness between images viewed with the right and left eyes because the brightness amplification factor and other brightness-related parameters set for the right and left images differ from each other. In this case, the viewer has a strong sense of discomfort.

SUMMARY

An advantage of some aspects of the invention is to provide not only an image display apparatus capable of displaying a high-quality image by improving a sense of contrast without any discrepancy in brightness between right-eye and left-eye images that form a stereoscopic image but also an image display method and an image supply apparatus.

An image display apparatus according to an aspect of the invention includes: a characteristic value calculating unit that calculates brightness-related image characteristic values of at least one of right-eye image data and left-eye image data that form stereoscopic image data, a expanding coefficient calculating unit that calculates a expanding coefficient common to the right-eye image data and the left-eye image data based on the image characteristic values calculated by the characteristic value calculating unit, a brightness expanding unit that performs brightness expanding on both the right-eye image data and the left-eye image data by using the expanding coefficient calculated by the expanding coefficient calculating unit, and an image display unit that displays an image based on the right-eye image data and the left-eye image data having undergone the brightness expanding.

According to the aspect of the invention, image characteristic values determined from at least one of right-eye image data and left-eye image data that form stereoscopic image data are used to calculate a expanding coefficient, and the expanding coefficient is used to perform brightness expanding based on the same expanding coefficient on both the right-eye image data and the left-eye image data that form the stereoscopic image data, whereby the sense of contrast can be improved by the brightness expanding without any discrepancy in brightness between the right-eye image data and the left-eye image data and hence a high-quality image can be displayed.

According to the aspect of the invention, it is possible that the brightness expanding along with the attenuation of light emitted from a light source allows the brightness of an image to be effectively expanded, whereby the sense of contrast can be further improved.

According to the aspect of the invention, it is also possible that the brightness expanding is performed on the right-eye image data and the left-eye image data by using the expanding coefficient calculated from either the right-eye image data or the left-eye image data, whereby the sense of contrast can be improved by the brightness expanding without any discrepancy in brightness between the right-eye image data and the left-eye image data and hence a high-quality image can be displayed.

According to the aspect of the invention, it is also possible that, when brightness expanding is performed on both right-eye image data and left-eye image data based on a expanding coefficient calculated from either the right-eye image data or the left-eye image data, the period during which image characteristic values are determined, the period during which the expanding coefficient is calculated, and the timing when the brightness expanding is performed are shifted from one another, whereby the processing load will not concentrate in a certain period or delay in image display due to processing load concentration will not occur, and hence quick processing and display are achieved. Further, since the brightness expanding is performed in synchronization with the timing for starting outputting either right-eye image data or left-eye image data, which is the image data from which the image characteristic values have been determined, the brightness expanding is first performed on the image data with which the expanding coefficient well accord, whereby the brightness expanding can be performed more naturally. Moreover, when image characteristic values are calculated from either right-eye image data or left-eye image data, which is the first image data in a set of stereoscopic image data, both the right-eye image data and the left-eye image data that form the set of stereoscopic image data undergo brightness expanding using the same expanding coefficient, whereby any discrepancy in brightness between the right-eye image data and the left-eye image data can be reliably eliminated.

According to the aspect of the invention, it is also possible that, a expanding coefficient is determined from both right-eye image data and left-eye image data, and the brightness expanding is performed effectively and naturally in consideration of the characteristics of both the right-eye image data and the left-eye image data.

According to the aspect of the invention, since target areas based on which image characteristic values are calculated are set in different positions in right-eye image data and left-eye image data, a brightness expanding coefficient can be determined, for example, in consideration of parallax between the right-eye image data and the left-eye image data, whereby the brightness expanding can be performed more effectively and naturally.

An image display method according to another aspect of the invention includes: calculating brightness-related image characteristic values of at least one of right-eye image data and left-eye image data that form stereoscopic image data, calculating a expanding coefficient common to the right-eye image data and the left-eye image data based on the calculated image characteristic values, performing brightness expanding on both the right-eye image data and the left-eye image data by using the calculated expanding coefficient, and displaying an image based on the right-eye image data and the left-eye image data having undergone the brightness expanding.

According to the aspect of the invention, image characteristic values determined from at least one of right-eye image data and left-eye image data that form stereoscopic image data are used to calculate a expanding coefficient, and the expanding coefficient is used to perform brightness expanding based on the same expanding coefficient on both the right-eye image data and the left-eye image data that form the stereoscopic image data, whereby the sense of contrast can be improved by the brightness expanding without any discrepancy in brightness between the right-eye image data and the left-eye image data and hence a high-quality image can be displayed.

An image supply apparatus according to still another aspect of the invention includes: a characteristic value calculating unit that calculates brightness-related image characteristic values of at least one of right-eye image data and left-eye image data that form stereoscopic image data, a expanding coefficient calculating unit that calculates a expanding coefficient common to the right-eye image data and the left-eye image data based on the image characteristic values calculated by the characteristic value calculating unit, and a brightness expanding unit that performs brightness expanding on both the right-eye image data and the left-eye image data, based on which an image is displayed, by using the expanding coefficient calculated by the expanding coefficient calculating unit.

According to the aspect of the invention, image characteristic values determined from at least one of right-eye image data and left-eye image data that form stereoscopic image data are used to calculate a expanding coefficient, and the expanding coefficient is used to perform brightness expanding based on the same expanding coefficient on both the right-eye image data and the left-eye image data that form the stereoscopic image data. When the stereoscopic image data formed of the right-eye image data and the left-eye image data having undergone the brightness expanding is outputted to an image display apparatus, the sense of contrast can be improved by the brightness expanding without any discrepancy in brightness between the right-eye image data and the left-eye image data and hence a high-quality image can be displayed.

According to the above aspects of the invention, brightness expanding can be performed on right-eye image data and left-eye image data that form stereoscopic image data without any discrepancy in brightness between the right-eye image data and the left-eye image data, whereby the sense of contrast can be improved and hence a high-quality image can be displayed.

BRIEF DESCRIPTION OF THE DRAWINGS

The invention will be described with reference to the accompanying drawings, wherein like numbers refer to like elements.

DESCRIPTION OF EXEMPLARY EMBODIMENTS

First Embodiment

Embodiments of the invention will be described below with reference to the drawings.

Figure 1:
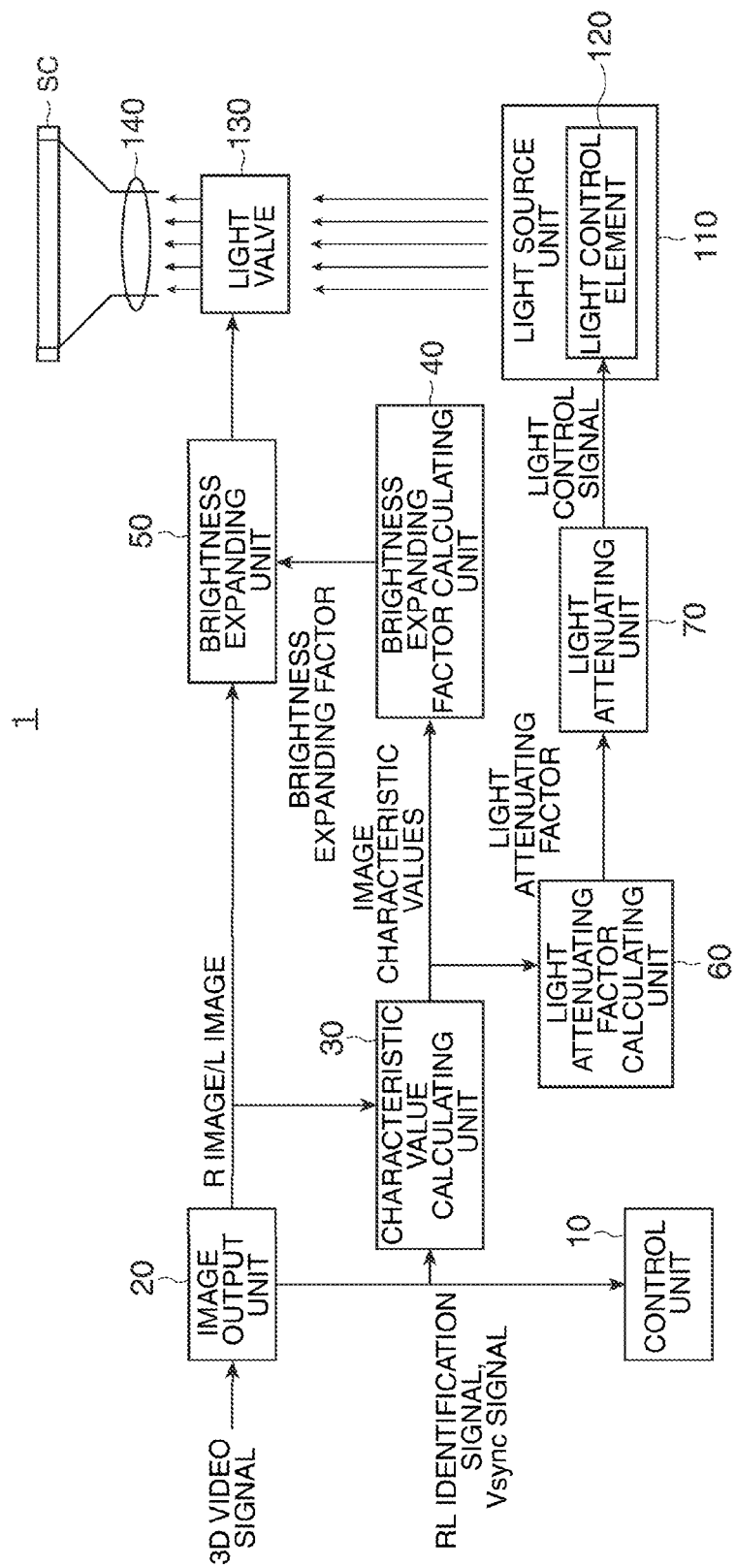
FIG. 1 shows a functional configuration of an image display apparatus according to a first embodiment.

FIG. 1 shows a functional configuration of an image display apparatus 1 according to a first embodiment to which the invention is applied.

The image display apparatus 1 shown in FIG. 1 is a projector that projects 3D (stereoscopic) video images on a screen SC and includes a light source unit 110 (light source), a light valve 130 as a modulating unit that modulates light emitted from the light source unit 110, and a projection system 140 that collects and enlarges the light modulated by the light valve 130 and projects the resultant light on the screen SC.

The image display apparatus 1 projects a stereoscopic image on the screen SC in a time division manner by alternately projecting an image for the right eye and an image for the left eye on the screen SC. A viewer who wears eyeglass-type filters including liquid crystal shutters or any other similar device can view the projected image as a stereoscopic image.

The light source unit 110 includes a light source formed, for example, of a xenon lamp, an ultrahigh pressure mercury lamp, or an LED. The light source unit 110 may further include a reflector and an auxiliary reflector for guiding the light emitted from the light source to the light valve 130 and a group of lenses (not shown), a polarizer, and other components for improving optical characteristics of projected light.

The light source unit 110 further includes a light control element 120 (light control unit) disposed in a path along which the light emitted from the light source travels to the light valve 130 and attenuating the light. The light control element 120, which, for example, includes a light attenuating plate that blocks the light emitted from the light source unit 110 and a drive circuit that adjusts the position or angle of the light attenuating plate in accordance with a predetermined light attenuating factor, attenuates the light by inserting the light attenuating plate to a light blocking position. The light control element 120 can alternatively be formed of a liquid crystal shutter in place of the light attenuating plate. In this case, the light is attenuated by adjusting the transmittance of the entire or part of the liquid crystal shutter.

The light valve 130 is formed of three transmissive liquid crystal panels corresponding to RGB colors, and image data on which brightness expanding is performed by a brightness expanding unit 50, which will be described later, are written on the transmissive liquid crystal panels in synchronization with vertical sync signals Vsync.

The light valve 130 is not necessarily formed of the three transmissive liquid crystal panels but may, for example, be formed of a combination of a single transmissive liquid crystal panel and a color wheel, three digital mirror devices (DMDs), or a combination of a single DMD and a color wheel.

The projection system 140 includes a prism that combines the RGB three modulated color fluxes modulated by the light valve 130 and a group of lenses that focuses projected images combined by the prism on the screen SC. When the light valve 130 is formed only of a single transmissive liquid crystal panel or a single DMD, a member corresponding to the prism is not required.

The components involved in the image display, such as the light source unit 110, the light valve 130, and the projection system 140, correspond as a whole to an image display unit in the appended claims, and the entire or part of the components can be replaced with a variety of functional components capable of displaying an image, such as those described above.

The image display apparatus 1 projects an image based on a stereoscopic video signal inputted from a video source (not shown) stored in a built-in storage device, a personal computer, a variety of video players, or any other external image supply apparatus (not shown).

The image display apparatus 1 further includes a control unit 10 that controls the entire image display apparatus 1, an image output unit 20 that alternately outputs right-eye image data and left-eye image data based on the stereoscopic video signal inputted from the video source or an external image supply apparatus, a characteristic value calculating unit 30 that determines image characteristic values based on the right-eye image data and the left-eye image data outputted from the image output unit 20, a brightness expanding factor calculating unit 40 (expanding coefficient calculating unit) that calculates a brightness expanding factor based on the image characteristic values determined by the characteristic value calculating unit 30, a brightness expanding unit 50 that performs brightness expanding in accordance with the brightness expanding factor calculated by the brightness expanding factor calculating unit 40, a light attenuating factor calculating unit 60 that calculates a light attenuating factor based on the image characteristic values determined by the characteristic value calculating unit 30, and a light attenuating unit 70 that drives the light control element 120 to attenuate the light based on the light attenuating factor calculated by the light attenuating factor calculating unit 60. The light attenuating unit 70, which controls the light control element 120, functions as a light control unit.

The image display apparatus 1 performs adaptive light control on an image to be projected by using the units described above. That is, the image display apparatus 1 attenuates the light emitted from the light source unit 110 and expands the grayscale of an image to be drawn by the light valve 130, whereby the dynamic range is widened and the sense of contrast is improved.

Figure 2:
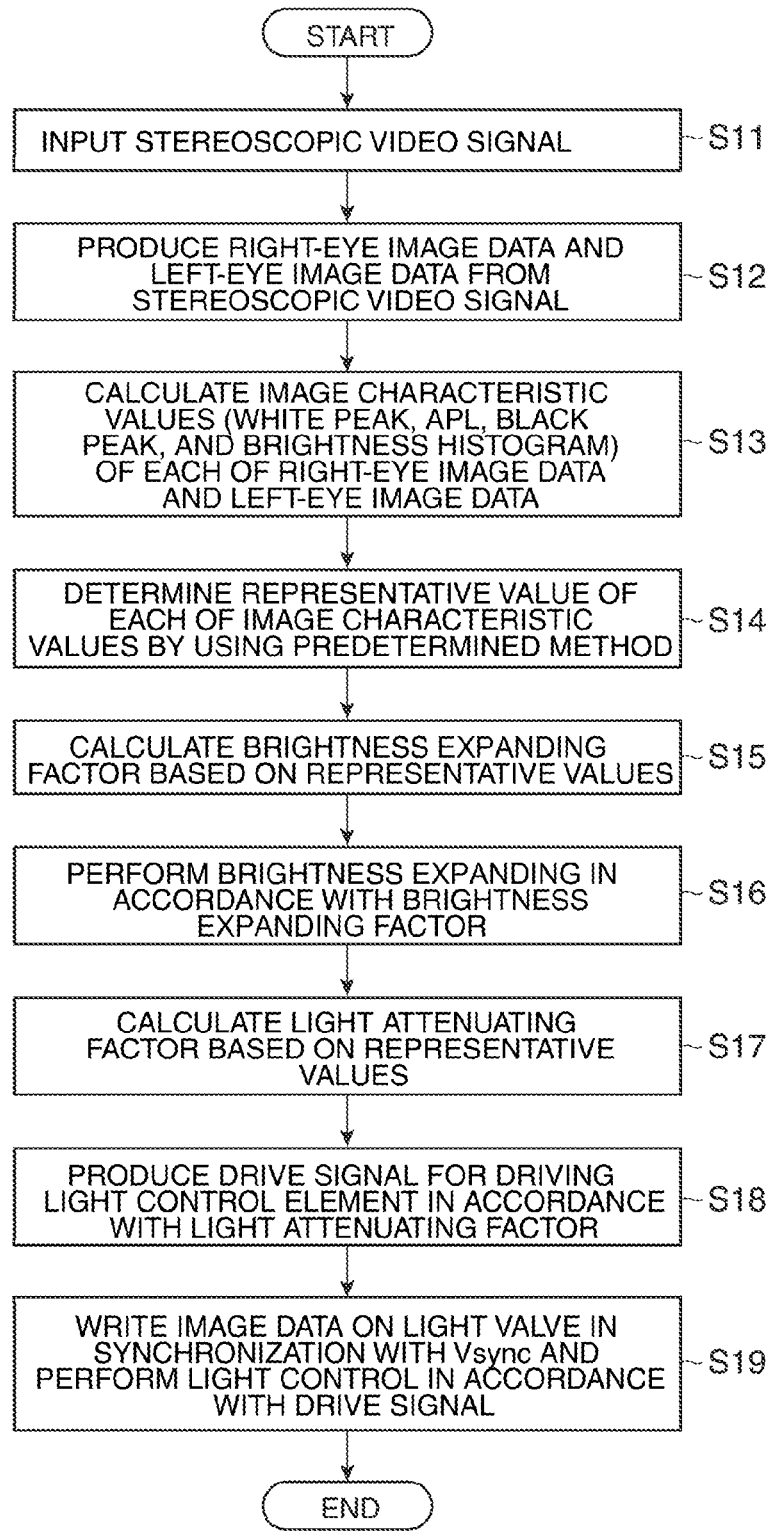
FIG. 2 is a flowchart showing actions of the image display apparatus in adaptive light control.

FIG. 2 is a flowchart showing actions of the image display apparatus 1 and shows a process procedure in the adaptive light control performed by the units in the image display apparatus 1 described above. The adaptive light control will be described below in detail with reference to the flowchart in FIG. 2 and FIG. 1.

The image output unit 20 handles a variety of stereoscopic video formats, such as a frame packing scheme, a side-by-side scheme, and a top-and-bottom scheme. The image output unit 20, to which a stereoscopic video signal (stereoscopic image data) is inputted (step S11), produces right-eye image data and left-eye image data from the inputted stereoscopic video signal and outputs the produced image data to the characteristic value calculating unit 30 and the brightness expanding unit 50 on a first-in, first-out basis (step S12).

When the inputted stereoscopic video signal is formatted by using the side-by-side scheme or the top-and-bottom scheme, the image output unit 20 clips right-eye image data and left-eye image data from the input signal, stretches the clipped image data in such a way that they agree with the display resolution of the light valve 130, and outputs the expanded image data.

The image output unit 20 outputs the right-eye image data and the left-eye image data alternately with the right-eye image data followed by the left-eye image data to the characteristic value calculating unit 30 and the brightness expanding unit 50. The image output unit 20 further outputs an RL identification signal indicating whether the image data being outputted is either the right-eye image data or the left-eye image data and vertical sync signals Vsync for the right-eye image data and the left-eye image data. When the inputted stereoscopic video signal is formatted by using the side-by-side scheme or the top-and-bottom scheme, the input signal contains a vertical sync signal per frame. In this case, the image output unit 20 clips right-eye image data and left-eye image data from the input signal and produces and outputs vertical sync signals Vsync indicating the timings when the clipped right-eye image data and left-eye image data start being written.

The control unit 10 controls each of the units in the image display apparatus 1 based on the RL identification signal and the vertical sync signals Vsync inputted from the image output unit 20.

The characteristic value calculating unit 30 receives the right-eye image data and the left-eye image data, the RL identification signal, and the vertical sync signals Vsync outputted from the image output unit 20. The characteristic value calculating unit 30 identifies whether the image data being inputted from the image output unit 20 is right-eye image data or left-eye image data and acquires the right-eye image data and the left-eye image data based on the RL identification signal and the vertical sync signals Vsync. The characteristic value calculating unit 30 then calculates characteristic values of each of the two sets of acquired image data (step S13). The characteristic values calculated by the characteristic value calculating unit 30 include the highest brightness (white peak WP), an APL (average picture level), the lowest brightness (black peak BP), and a brightness histogram obtained from the entire image data. The characteristic value calculating unit 30 outputs the calculated image characteristic values to the brightness expanding factor calculating unit 40 and the light attenuating factor calculating unit 60.

Figure 3:
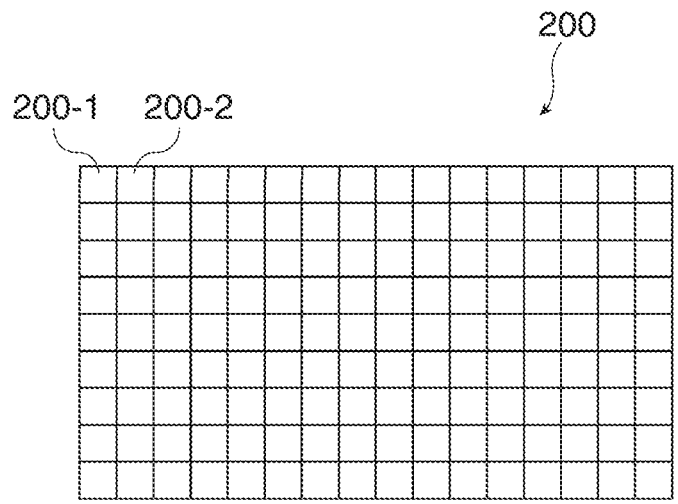
FIG. 3 diagrammatically shows the configuration of image data to be processed.

FIG. 3 diagrammatically shows the configuration of image data 200 to be processed in the present embodiment. Since right-eye image data and left-eye image data have the same size and resolution in the present embodiment, the right-eye image data and the left-eye image data are processed in the same way.

The characteristic value calculating unit 30 partitions the image data 200 to be processed (either right-eye image data or left-eye image data), which is formed, for example, of 1920× 1080 pixels, into 144 pixel blocks 200-1 to 200-144 arranged in a matrix of 16 horizontal pixel blocks and 9 vertical pixel blocks, as shown in FIG. 3. The size of each of the pixel blocks 200-1 to 200-144 is 120 vertical pixels by 120 horizontal pixels.

The characteristic value calculating unit 30 averages the brightness of the pixels that form each of the pixel blocks, uses the average as representative brightness of the pixel block, and stores the representative brightness of the pixel block in a RAM or any other suitable device. The brightness used herein may, for example, be the highest of RGB signal values or the sum of an R signal value multiplied by 0.299, a G signal value multiplied by 0.587, and a B signal value multiplied by 0.144. The representative brightness is not limited to the average brightness but may alternatively be the brightness of a pixel in the vicinity of the center of each of the pixel blocks (representative value). The characteristic value calculating unit 30 selects the highest representative brightness of those of the pixel blocks that form the image data 200 as the white peak WP thereof, selects the lowest as the black peak BP, and calculates the average of the representative brightness as the APL. Further, the characteristic value calculating unit 30 produces a brightness histogram from the distribution of the representative brightness of the pixel blocks that form the image data 200.

The characteristic value calculating unit 30 determines the white peak WP, the black peak BP, the APL, and the brightness histogram of the image data 200, that is, each of right-eye image data and left-eye image data that are paired to form a stereoscopic image as described above, and then determines representative values that represent the right-eye image data and the left-eye image data (step S14). A method for determining a representative value is determined in advance for each of the image characteristic values.

A. White Peak

The representative value of the white peak WP is the higher one, that is, the brighter one of the white peak WP of the right-eye image data and the white peak WP of the left-eye image data, which can be mathematically expressed by the following Expression (1).

$$WP_O = \text{Max}(WP_R, WP_L) \quad (1)$$

In the Expression (1), $WP_O$ denotes the representative white peak, $WP_R$ denotes the white peak of the right-eye image data, and $WP_L$ denotes the white peak of the left-eye image data.

The reason why the representative value is selected as described above is that light control is suitably performed with reference to the brightness of the highest brightness area in image data. For example, if a dark value is set as the representative white peak WP, brightness expanding may cause the highest brightness area in right-eye image data or left-eye image data to become whiteouts.

B. APL

The representative value of the APL is the average of the APL of the right-eye image data and the APL of the left-eye image data, which can be mathematically expressed by the following Expression (2).

$$APL_O = \text{Ave}(APL_R, APL_L) \quad (2)$$

In the Expression (2), $APL_O$ denotes the representative APL, $APL_R$ denotes the APL of the right-eye image data, and $APL_L$ denotes the APL of the left-eye image data.

Since the APL is inherently average brightness, it is also suitable to use the average of APLs of the two image data.

C. Black Peak

The representative value of the black peak BP is the lower one, that is, the darker one of the black peak BP of the right-eye image data and the black peak BP of the left-eye image data, which can be mathematically expressed by the following Expression (3).

$$BP_O = \text{Min}(BP_R, BP_L) \quad (3)$$

In the Expression (3), $BP_O$ denotes the representative black peak, $BP_R$ denotes the black peak of the right-eye image data, and $BP_L$ denotes the black peak of the left-eye image data.

A black peak BP is the brightness in the lowest brightness area in image data. It is therefore suitable, when there are two sets of image data to be processed, to use the brightness of the darkest area in the two sets of image data as the representative value because brightness expanding can be performed in accordance with the contrast of the image data.

D. Brightness Histogram

The representative value of the brightness histogram is the average of the brightness histogram of the right-eye image data and the brightness histogram of the left-eye image data, which can be mathematically expressed by the following Expression (4).

$$\text{Hist}_O(X) = \{\text{Hist}_R(X) + \text{Hist}_L(X)\}/2 \quad (4)$$

In the Expression (4), $\text{Hist}_O(X)$ denotes the representative brightness histogram, $\text{Hist}_R(X)$ denotes the brightness histogram of the right-eye image data, and $\text{Hist}_L(X)$ denotes the brightness histogram of the left-eye image data. When the grayscale of each of the image data is 10 bits, X ranges from 0 to 1023.

According to Expression (4), average brightness at each grayscale level is a representative value.

As described above, the characteristic value calculating unit 30 determines a plurality of image characteristic values of right-eye image data and left-eye image data and determines representative values of the determined image characteristic values by using methods corresponding to the types or attributes of the image characteristic values, whereby optimum values for brightness expanding can be determined from the image characteristic values of the two sets of image data. The representative image characteristic values are then outputted to the brightness expanding factor calculating unit 40 and the light attenuating factor calculating unit 60.

The characteristic value calculating unit 30 may not necessarily determine image characteristic values in the entire image data 200 as shown in FIG. 3, but may instead determine image characteristic values only in part of the image data 200. For example, when the relationship between inputted image data and the display resolution of the light valve 130 creates a black area in the periphery of the image data, image characteristic values may be determined in an area other than the periphery of the image data or determined by weighting the image data in such a way that central pixel blocks of the image data are more significant than pixel blocks in the periphery of the image data and taking the weighted pixel blocks into consideration.

Still alternatively, the image data 200 may not be partitioned into pixel blocks, but the pixels of the entire image data 200 may be referred to determine the white peak WP of the image data 200 by using the highest brightness, determine the black peak BP by using the lowest brightness, determine the APL by using the average of the brightness, and produce the brightness histogram from the distribution of the brightness of the pixels.

The brightness expanding factor calculating unit 40 calculates the brightness expanding factor based on the representative image characteristic values inputted from the characteristic value calculating unit 30 (step S15).

Figure 4:
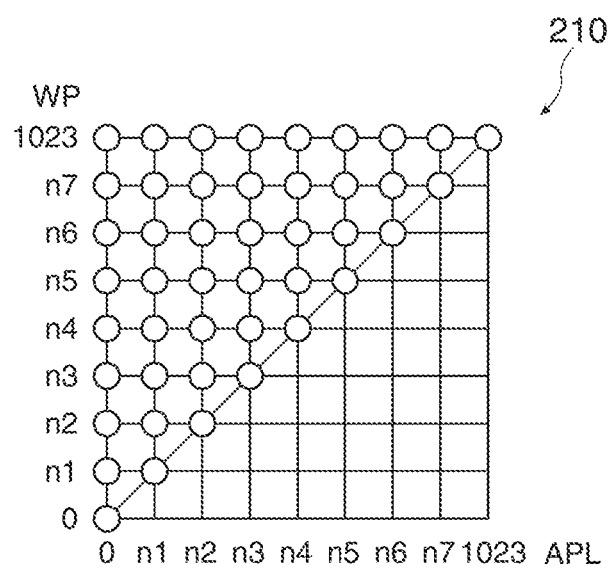
FIG. 4 diagrammatically shows a LUT for determining a brightness expanding factor.

FIG. 4 diagrammatically shows a LUT 210 for determining the brightness expanding factor. In the LUT 210 illustrated in FIG. 4, the brightness expanding factor is defined in correspondence with a white peak WP and an APL.

The brightness expanding factor calculating unit 40 refers to the LUT 210 and acquires a brightness expanding factor defined in the LUT 210 in correspondence with the white peak WP and the APL inputted from the characteristic value calculating unit 30. The brightness expanding factor is thus determined. When the point corresponding to the inputted white peak WP and APL is shifted from any grid point where a brightness expanding factor is defined, the brightness expanding factor calculating unit 40 calculates a brightness expanding factor by performing interpolation based on the brightness expanding factors defined at three or four grid points around the point corresponding to the inputted white peak WP and APL. The brightness expanding factor calculating unit 40 thus determines a brightness expanding factor and outputs the determined brightness expanding factor to the brightness expanding unit 50.

The brightness expanding factor calculating unit 40 does not necessarily use the LUT 210 shown in FIG. 4 but may alternatively use a three-dimensional LUT in which brightness expanding factors are defined in correspondence with white peaks WP, black peaks BP, and APLs or a two-dimensional LUT using black peaks BP and white peaks WP or black peaks BP and APLs. Still alternatively, the brightness expanding factor calculating unit 40 may determine a brightness expanding factor by performing computation based on one or more of the white peak WP, black peak BP, APL, and brightness histogram.

The brightness expanding unit 50 expands the grayscale of each of the right-eye image data and the left-eye image data inputted from the image output unit 20 by using the brightness expanding factor determined by the brightness expanding factor calculating unit 40 (step S16). For example, let now R, G, and B be color information in image data inputted from the image output unit 20 to the brightness expanding unit 50, R', G', and B' be color information after brightness expanding, and kg be a brightness expanding factor, and the following expressions are satisfied: R'=kgXR, G'=kgXG, and B'=kgXB.

As described above, the brightness expanding unit 50 expands the brightness of right-eye image data and left-eye image data that are paired to form stereoscopic image data corresponding to a single frame in accordance with a common brightness expanding factor calculated by the brightness expanding factor calculating unit 40 based on representative values. The brightness and the sense of contrast between the paired right-eye image data and left-eye image data become the same or do not differ from each other, whereby the stereoscopic image data having undergone the adaptive light control will not cause a sense of discomfort.

On the other hand, the light attenuating factor calculating unit 60 calculates the light attenuating factor based on the representative image characteristic values inputted from the characteristic value calculating unit 30 (step S17). The light attenuating factor can, for example, be calculated by creating a LUT (not shown) in which light attenuating factors are defined in correspondence with two or more of the white peak WP, the APL, and the black peak BP and referring to the LUT, as in the case of the brightness expanding factor described with reference to FIG. 4. That is, the light attenuating factor calculating unit 60 acquires a light attenuating factor defined in the LUT in correspondence with the white peak WP, the APL, or the black peak BP inputted from the characteristic value calculating unit 30. When the point corresponding to the white peak WP, the APL, or the black peak BP inputted from the characteristic value calculating unit 30 is shifted from any grid point where a light attenuating factors is defined, the light attenuating factor calculating unit 60 calculates a light attenuating factor by performing interpolation based on the light attenuating factors defined at three or four grid points around the point corresponding to the inputted value. The light attenuating factor calculating unit 60 thus determines a light attenuating factor and outputs the determined light attenuating factor to the light attenuating unit 70. The light attenuating factor calculating unit 60 does not necessarily use a two-dimensional LUT but may alternatively determine the light attenuating factor by using a three-dimensional LUT or by performing computation based on one or more of the white peak WP, black peak BP, APL, and brightness histogram.

The light attenuating factor calculating unit 60 then produces a drive signal for driving the light control element 120 in such a way that the calculated light attenuating factor ka is achieved and outputs the drive signal to the light attenuating unit 70 (step S18).

At this point, the image data having undergone the brightness expanding performed by the brightness expanding unit 50 is inputted to the light valve 130 and written thereby in synchronization with the vertical sync signals Vsync under the control of the control unit 10, and the light attenuating unit 70 controls the light control element 120 in accordance with the drive signal inputted from the light attenuating factor calculating unit 60 and in synchronization with the image data writing timing. The light control is thus performed (step S19).

When a stereoscopic video signal is inputted at 60 frames/sec to the characteristic value calculating unit 30, the characteristic value calculating unit 30 alternately outputs right-eye image data and left-eye image data at 120 frames/sec. The right-eye image data and the left-eye image data are paired to form stereoscopic image data corresponding to a single frame. When images are projected at such a fast speed, image data from which a brightness expanding factor and a light attenuating factor are calculated may differ from image data on which light control is performed so that the computation associated with the light control cause no delay in the drawing of the light valve 130. Specifically, a brightness expanding factor and a light attenuating factor are calculated by using stereoscopic image data formed of right-eye image data corresponding to an n-th frame and left-eye image data corresponding to an (n+1)-th frame, and the light control based on the thus calculated brightness expanding factor and light attenuating factor is performed on stereoscopic image data formed of right-eye image data corresponding to an (n+2)-th frame and left-eye image data corresponding to an (n+3)-th frame. In this case, the image data from which the brightness expanding factor and the light attenuating factor have been calculated differs from the image data on which the light control based on the calculated brightness expanding factor and light attenuating factor is performed, but the difference between the two sets of image data corresponds only to a set of stereoscopic image data. A sense of discomfort resulting from the difference is therefore small, and it is expected that the sense of contrast is improved by the light control and the image quality is improved by widening the dynamic range.

As described above, the image display apparatus 1 according to the first embodiment to which the invention is applied, which includes the light valve 130 that modulates light emitted from the light source unit 110, the image output unit 20 that alternately outputs right-eye image data and left-eye image data that form stereoscopic image data to the light valve 130, the characteristic value calculating unit 30 that calculates brightness-related image characteristic values of at least one of the right-eye image data and the left-eye image data, the brightness expanding factor calculating unit 40 that calculates a brightness expanding factor common to the right-eye image data and the left-eye image data based on the image characteristic values calculated by the characteristic value calculating unit 30, and the brightness expanding unit 50 that performs brightness expanding on both the right-eye image data and the left-eye image data to be outputted to the light valve 130 by using the brightness expanding factor calculated by the brightness expanding factor calculating unit 40, calculates a brightness expanding factor from image characteristic values determined from right-eye image data and left-eye image data that form stereoscopic image data and uses the brightness expanding factor to perform brightness expanding on both the right-eye image data and the left-eye image data that form the stereoscopic image data, whereby the sense of contrast can be improved by the brightness expanding without any discrepancy in brightness between the right-eye image data and the left-eye image data and hence a high-quality image can be displayed.

In the above description, the image display apparatus 1 uses the brightness expanding factor as a expanding coefficient based on which brightness of right-eye image data and left-eye image data is expanded, but a specific aspect of the expanding coefficient is not limited to the brightness expanding factor.

The image display apparatus 1, which further includes the light control element 120 that controls the amount of light emitted from the light source unit 110 in correspondence with the brightness expanding performed by the brightness expanding unit 50, controls the amount of light emitted from the light source unit 110 by using the light control element 120 in addition to the brightness expanding, whereby the brightness of a displayed image can be effectively expanded and the sense of contrast can be further improved.

Further, in the image display apparatus 1, since the characteristic value calculating unit 30 calculates image characteristic values of both right-eye image data and left-eye image data, and the brightness expanding factor calculating unit 40 determines a brightness expanding factor from the image characteristic values calculated from both the image data by the characteristic value calculating unit 30, the brightness expanding can be performed effectively and naturally in consideration of the characteristics of both the right-eye image data and the left-eye image data.

Second Embodiment

Figure 5:
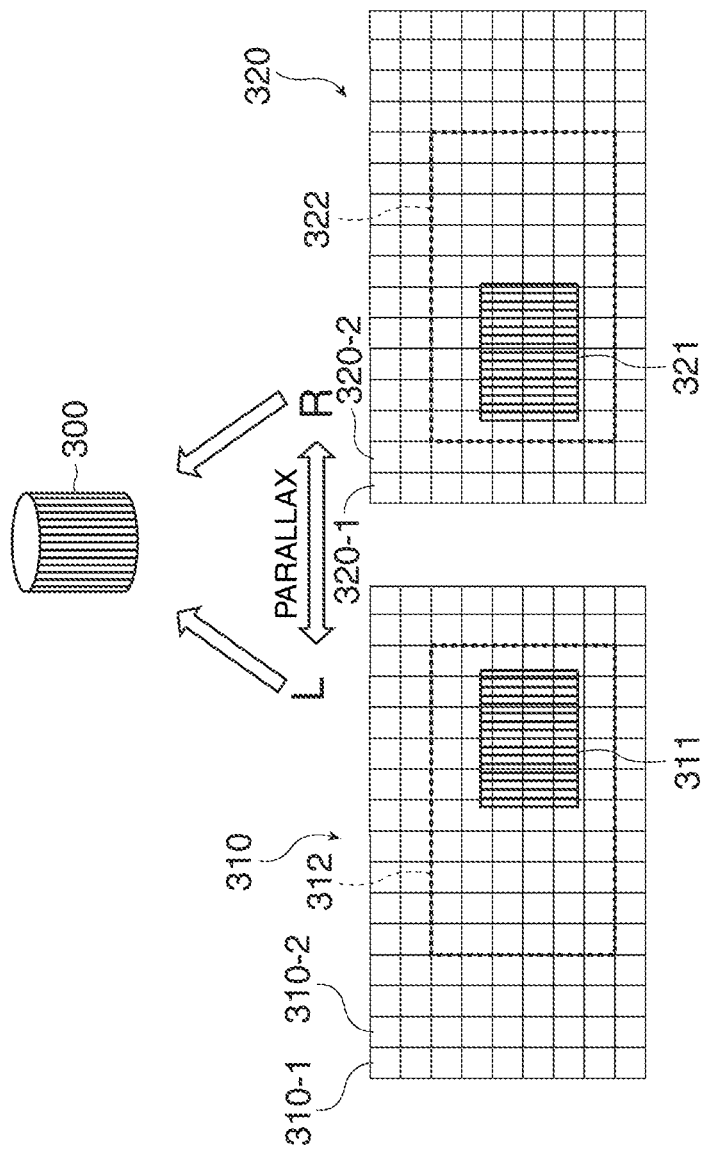
FIG. 5 diagrammatically shows the configuration of image data to be processed and areas to be processed by an image display apparatus according to a second embodiment.

FIG. 5 diagrammatically shows the configuration of image data to be processed and areas to be processed by an image display apparatus 1 according to a second embodiment to which the invention is applied.

The second embodiment will be described with reference to a case where the image display apparatus 1 described above in the first embodiment determines image characteristic values from part of right-eye image data and left-eye image data. In the second embodiment, the components configured in the same manner as in the first embodiment will not be illustrated or described.

Left-eye image data 310 and right-eye image data 320 shown in FIG. 5 are formed, for example, of 1920×1080 pixels, and partitioned into 144 pixel blocks 310-1 to 310-144 and 320-1 to 320-144 arranged in a matrix of 16 horizontal pixel blocks and 9 vertical pixel blocks as shown in FIG. 5. The size of each of the pixel blocks is also 120 vertical pixels by 120 horizontal pixels.

In the example shown in FIG. 5, the left-eye image data 310 and the right-eye image data 320 form stereoscopic image data by which an object 300 is displayed stereoscopically, and the left-eye image data 310 and the right-eye image data 320 contain images 311 and 321 of the object 300, respectively.

In the left-eye image data 310, a target area 312 is set as an area based on which the characteristic value calculating unit 30 calculates image characteristic values. The target area 312 illustrated in FIG. 5 is formed of 10 horizontal pixel blocks and 6 vertical pixel blocks, 60 pixel blocks in total. In the right-eye image data 320, a target area 322 is similarly set as an area based on which the characteristic value calculating unit 30 calculates image characteristic values. The target area 322 is formed of 10 horizontal pixel blocks and 6 vertical pixel blocks, 60 pixel blocks in total, as in the case of the target area 312.

The characteristic value calculating unit 30 calculates image characteristic values, such as a white peak, a black peak, an APL, and a brightness histogram, for each of the target areas 312 and 322, as described in the first embodiment. The characteristic value calculating unit 30 then uses the image characteristic values determined from the target area 312 as image characteristic values of the left-eye image data 310, uses the image characteristic values determined from the target area 322 as image characteristic values of the right-eye image data 320, and carries out the actions described in the first embodiment.

It is noted that there exists parallax between the left-eye image data 310 and the right-eye image data 320 that form a set of stereoscopic image data, and that images derived from the image data differ from each other due to the parallax. In the example shown in FIG. 5, the image 311 is positioned rightward in the left-eye image data 310, whereas the image 321 is positioned leftward in the right-eye image data 320.

The image display apparatus 1 thus sets the target areas 312 and 322 in different positions in the horizontal direction in the left-eye image data 310 and the right-eye image data 320. The target areas 312 and 322 are so set that the position of the target area 312 in the left-eye image data 310 and the position of the target area 322 in the right-eye image data 320 differ from each other, as shown in FIG. 5. That is, the target area 312 is positioned rightward in the left-eye image data 310 and the target area 322 is positioned leftward in the right-eye image data 320 in correspondence with the parallax between the left-eye image data 310 and the right-eye image data 320.

The difference in the images derived from the left-eye image data 310 and the right-eye image data 320 (for example, the difference in position between the images 311 and 321) depends on the amount of parallax. The amount by which the target area 312 is shifted rightward from the center of the left-eye image data 310 and the amount by which the target area 322 is shifted leftward from the center of the right-eye image data 320 are also determined in correspondence with the amount of parallax. The image within the target area 312 and the image within the target area 322 are therefore substantially the same or differ from each other only by a relatively small amount. Determining image characteristic values (white peak, black peak, APL, and brightness histogram) from the target areas 312 and 322 and determining representative values of the image characteristic values in the same manner as in the first embodiment therefore allow appropriate representative image characteristic values to be obtained. Thereafter, a brightness expanding factor is calculated based on the representative values, the brightness expanding unit 50 performs brightness expanding, and the resultant image data is inputted to the light valve 130 and drawn in synchronization with vertical sync signals Vsync. Further, the light attenuating factor calculating unit 60 calculates a light attenuating factor based on the representative image characteristic values determined from the target areas 312 and 322, and the light attenuating unit 70 controls the light control element 120 in accordance with a drive signal that the light attenuating factor calculating unit 60 outputs in accordance with the light attenuating factor. Light control is thus performed in addition to the brightness expanding.

As described above, the image display apparatus 1 according to the second embodiment to which the invention is applied is configured to use the characteristic value calculating unit 30 to calculate image characteristic values of the left-eye image data 310 and the right-eye image data 320 that form stereoscopic image data based on the data in the target areas 312 and 322 set in the respective image data 310 and 320, and the target areas 312 and 322 are so set that the position of the target area 312 in the left-eye image data 310 and the position of the target area 322 in the right-eye image data 320 differ from each other. That is, since the target areas 322 and 312, based on which image characteristic values are calculated, are set in different positions in the right-eye image data 320 and left-eye image data 310, a brightness expanding factor can be determined in consideration of the parallax between the right-eye image data and the left-eye image data, for example, by calculating image characteristic values of the right-eye and left-eye image data based on the target areas containing substantially the same images, whereby the brightness expanding can be performed more effectively and naturally.

Third Embodiment

Figure 6:
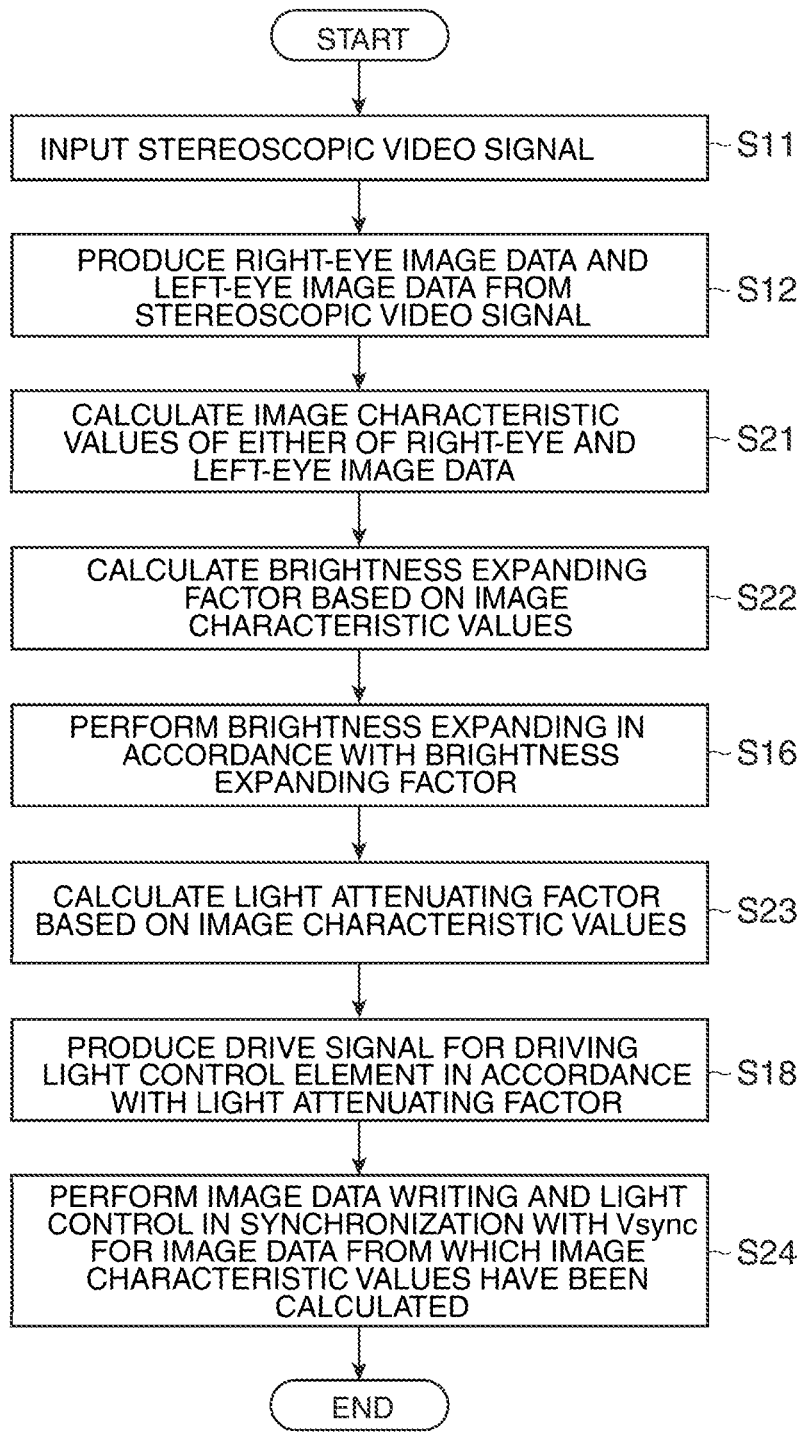
FIG. 6 is a flowchart showing actions of an image display apparatus according to a third embodiment.

FIG. 6 is a flowchart showing actions of an image display apparatus 1 according to a third embodiment to which the invention is applied. The third embodiment will be described with reference to a case where the image display apparatus 1 described above in the first embodiment determines image characteristic values of either right-eye image data or left-eye image data and processes both the image data based on the image characteristic values. In the third embodiment, the components configured in the same manner as in the first embodiment will not be illustrated or described.

FIG. 6 shows actions carried out by the image display apparatus 1 in place of the actions shown in FIG. 2. In the following description, the same process steps as those in FIG. 2 have the same step reference characters as those in FIG. 2 and no description thereof will be made.

The image display apparatus 1, when a stereoscopic video signal is inputted to the image output unit 20 (step S11), produces right-eye image data and left-eye image data from the inputted stereoscopic video signal by using the function of the image output unit 20 and outputs the produced image data to the characteristic value calculating unit 30 and the brightness expanding unit 50 on a first-in, first-out basis (step S12). The characteristic value calculating unit 30 then chooses either the acquired right-eye image data or left-eye image data and calculates image characteristic values of the chosen image data (step S21). The image characteristic values calculated by the characteristic value calculating unit 30, for example, include a white peak, an APL, a black peak, and a brightness histogram obtained from the entire image data. The characteristic value calculating unit 30 outputs the calculated image characteristic values to the brightness expanding factor calculating unit 40 and the light attenuating factor calculating unit 60.

The brightness expanding factor calculating unit 40 calculates a brightness expanding factor based on the image characteristic values inputted from the characteristic value calculating unit 30 and outputs the brightness expanding factor to the brightness expanding unit 50 (step S22). The specific action in step S22 is the same as that in step S15 (FIG. 2) described above in the first embodiment.

The brightness expanding unit 50 expands the grayscale of each of the right-eye image data and the left-eye image data inputted from the image output unit 20 by using the brightness expanding factor determined by the brightness expanding factor calculating unit 40 (step S16). The brightness expanding unit 50 expands the brightness of both the right-eye image data and the left-eye image data that are paired to form stereoscopic image data corresponding to a single frame in accordance with the common brightness expanding factor calculated by the brightness expanding factor calculating unit 40. The brightness and the sense of contrast between the paired right-eye image data and left-eye image data become the same or do not differ from each other, whereby the stereoscopic image data having undergone the adaptive light control will not cause a sense of discomfort.

The image display apparatus 1 calculates a light attenuating factor by using the light attenuating factor calculating unit 60 based on the image characteristic values inputted from the characteristic value calculating unit 30 (step S23). The light attenuating factor is calculated, for example, in the same manner as in step S17 (FIG. 2) described above in the first embodiment. The light attenuating factor calculating unit 60 then produces a drive signal for driving the light control element 120 in such a way that the calculated light attenuating factor is achieved and outputs the drive signal to the light attenuating unit 70 (step S18).

Thereafter, the brightness expanding unit 50 inputs and writes the right-eye image data and the left-eye image data to the light valve 130 under the control of the control unit 10 in synchronization with vertical sync signals Vsync for the image data from which the image characteristic values have been calculated in step S21. At the same time, the light attenuating unit 70 controls the light control element 120 in synchronization with the image data writing timing. The light control is thus performed (step S24).

FIGS. 7A to 7F are timing charts showing the actions of the image display apparatus 1.

Figure 7:
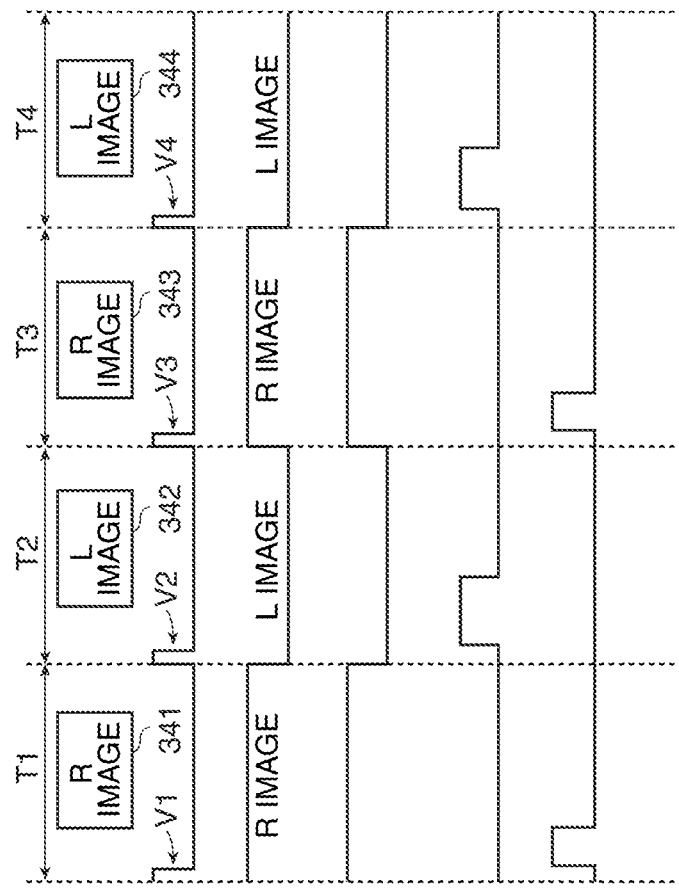
FIGS. 7A to 7F are timing charts showing the actions of the image display apparatus according to the third embodiment.

FIG. 7A shows a video signal carrying right-eye image data and left-eye image data outputted from the image output unit 20. FIG. 7B shows vertical sync signals Vsync for the image data outputted from the image output unit 20. FIG. 7C shows the RL identification signal outputted from the image output unit 20. FIG. 7D shows timings when the characteristic value calculating unit 30 calculates image characteristic values. FIG. 7E shows timings when the brightness expanding factor calculating unit 40 calculates a brightness expanding factor and the light attenuating factor calculating unit 60 calculates a light attenuating factor. FIG. 7F shows timings when the brightness expanding unit 50 performs brightness expanding and the light attenuating unit 70 performs light control. Among the timing charts shown in FIGS. 7A to 7F, those shown in FIGS. 7A to 7C can be used in the first and second embodiments.

The image output unit 20 alternately outputs right-eye image data (labeled as R image in FIGS. 7A to 7F) and left-eye image data (labeled as L image in FIGS. 7A to 7F) based on an externally inputted stereoscopic video signal, as shown in FIG. 7A. In FIGS. 7A to 7F, the image data are outputted in the following order: right-eye image data 341, left-eye image data 342, right-eye image data 343, and left-eye image data 344. Further, periods T1, T2, T3, and T4 are those during which the right-eye image data 341, the left-eye image data 342, the right-eye image data 343, and the left-eye image data 344 are outputted, respectively.

The image output unit 20, when alternately outputting the right-eye image data and the left-eye image data, outputs a vertical sync signal Vsync for each set of image data. The vertical sync signals Vsync shown in FIG. 7B have pulses V1, V2, V3, and V4 that coincide with the start timings of the periods T1, T2, T3, and T4, respectively. The image output unit 20, when producing right-eye image data and left-eye image data from an input video signal formatted, for example, by using the side-by-side scheme or the top-and-bottom scheme as described above, produces vertical sync signals Vsync having pulses corresponding to the newly produced image data.

The image output unit 20 further outputs the RL identification signal indicating whether the image data being outputted is right-eye image data or left-eye image data, as shown in FIG. 7C. In the example shown in FIGS. 7A to 7F, the RL identification signal becomes Hi during the period over which right-eye image data is being outputted, whereas being Lo during the period over which left-eye image data is being outputted.

In the third embodiment, the characteristic value calculating unit 30, during the periods over which right-eye image data is being outputted (periods T1 and T3), acquires the right-eye image data and calculates image characteristic values thereof at the same time, as shown in FIG. 7D.

Subsequently, the brightness expanding factor calculating unit 40 and the light attenuating factor calculating unit 60 calculate a brightness expanding factor and a light attenuating factor during the periods over which left-eye image data is outputted based on the image characteristic values calculated by the characteristic value calculating unit 30, as shown in FIG. 7E. In detail, the brightness expanding factor calculating unit 40 and the light attenuating factor calculating unit 60 calculate a brightness expanding factor and a light attenuating factor during the period T2 based on the image characteristic values calculated during the period T1 by the characteristic value calculating unit 30 and calculate another brightness expanding factor and another light attenuating factor during the period T4 based on the image characteristic values calculated during the period T3.

The brightness expanding and the light control using the light control element 120 are performed in synchronization with vertical sync signals Vsync for right-eye image data. That is, in accordance with the brightness expanding factor and the light attenuating factor calculated during the period T2 by the brightness expanding factor calculating unit 40 and the light attenuating factor calculating unit 60 and in synchronization with the pulse V3 in the corresponding vertical sync signal Vsync, image data having undergone brightness expanding starts being written to the light valve 130 and the light control starts being performed by the light control element 120.

In other words, image characteristic values are calculated from the right-eye image data 341 outputted during the period T1, a brightness expanding factor and a light attenuating factor are calculated during the period T2 based on the image characteristic values, and brightness expanding and light control are performed during the period T3 in accordance with the brightness expanding factor and the light attenuating factor.

Since the timing when the characteristic value calculating unit 30 calculates image characteristic values differs from the timing when the brightness expanding factor calculating unit 40 and the light attenuating factor calculating unit 60 calculate a brightness expanding factor and a light attenuating factor, the processing load will not concentrate in a certain period or delay in image display due to processing load concentration will not occur, which is particularly effective, for example, when a single hardware component executes a program that provides the characteristic value calculating unit 30, the brightness expanding factor calculating unit 40, and the light attenuating factor calculating unit 60.

Further, since the characteristic value calculating unit 30 determines image characteristic values of right-eye image data and the brightness expanding is performed in synchronization with the vertical sync signal Vsync for the right-eye image data in the example shown in FIGS. 7A to 7F, the image data that will undergo brightness expanding well accords with the expanding coefficient. The brightness expanding can therefore be performed more naturally.

Moreover, when right-eye image data is first outputted in a single stereoscopic video signal and image characteristic values of the right-eye image data are calculated as shown in FIGS. 7A to 7F, both the right-eye image data and the left-eye image data that form a set of stereoscopic image data undergo brightness expanding using the same expanding coefficient. That is, when the right-eye image data 343 and the left-eye image data 344 form a set of stereoscopic image data, the brightness expanding is initiated in synchronization with the vertical sync signal Vsync for the right-eye image data 343. In this way, the set of stereoscopic image data is expanded by using a single brightness expanding factor. As a result, the sense of contrast can be improved by the brightness expanding without any discrepancy in brightness between the right-eye image data and the left-eye image data and hence a high-quality image can be displayed.

Fourth Embodiment

Figure 8:
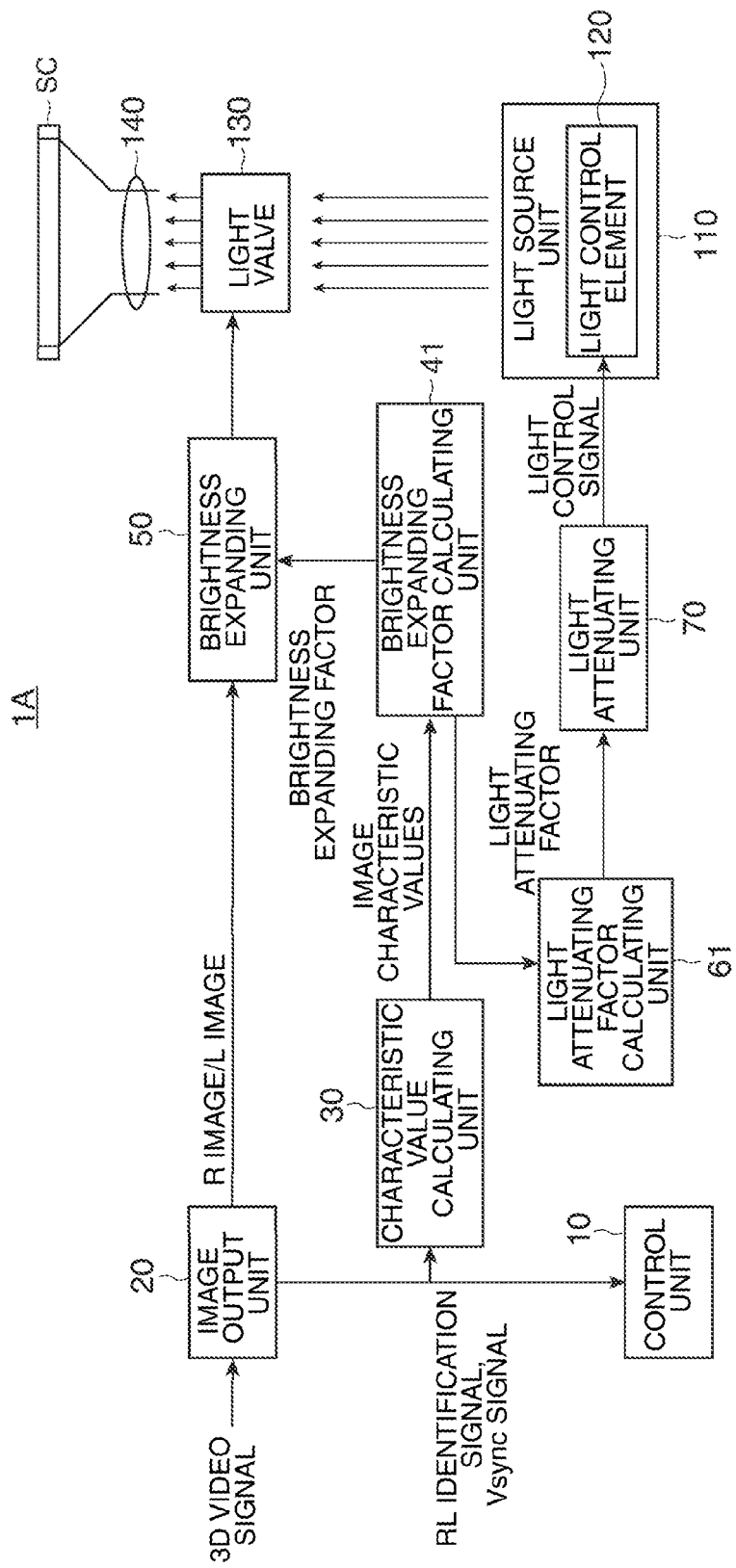
FIG. 8 shows a functional configuration of an image display apparatus according to a fourth embodiment.

FIG. 8 shows the configuration of an image display apparatus 1A according to a fourth embodiment to which the invention is applied. The image display apparatus 1A described in the fourth embodiment differs from the image display apparatus 1 according to the first embodiment described above in that the light attenuating factor calculating unit 60 is replaced with a light attenuating factor calculating unit 61 that calculates a light attenuating factor based on a brightness expanding factor.

Among the components accommodated in the image display apparatus 1A, those configured in the same manner as in the image display apparatus 1 according to the first embodiment described above have the same reference characters and no description thereof will be made.

The image display apparatus 1A shown in FIG. 8 includes a brightness expanding factor calculating unit 41 that calculates a brightness expanding factor based on image characteristic values calculated by the characteristic value calculating unit 30 and outputs the calculated brightness expanding factor not only to the brightness expanding unit 50 but also to the light attenuating factor calculating unit 61. The light attenuating factor calculating unit 61 accommodated in the image display apparatus 1A calculates a light attenuating factor based on the brightness expanding factor outputted from the brightness expanding factor calculating unit 41.

The brightness expanding factor calculating unit 41 calculates a brightness expanding factor in the same manner as in the brightness expanding factor calculating unit 40 in the first embodiment described above. The brightness expanding factor calculating unit 41 differs from the brightness expanding factor calculating unit 40 in that a brightness expanding factor is outputted not only to the brightness expanding unit 50 but also to the light attenuating factor calculating unit 61. The timings when the brightness expanding factor calculating unit 41 calculates brightness expanding factors are, for example, those shown in FIGS. 7A to 7F described in the third embodiment.

The light attenuating factor calculating unit 61 calculates a light attenuating factor by substituting the brightness expanding factor inputted from the brightness expanding factor calculating unit 41 into an arithmetic equation set in advance.

For example, the light attenuating factor calculating unit 61 determines a light attenuating factor ka by substituting a brightness expanding factor kg into the following Equation (5).

$$ka = kg^{-\gamma} \quad (5)$$

In the Expression (5), γ denotes a gamma characteristic value of the image display apparatus 1A.

The image display apparatus 1A according to the fourth embodiment, when calculating a light attenuating factor, does not create a LUT in which light attenuating factors are defined in correspondence with white peaks, APLs, black peaks, or other parameters or refer to the LUT to calculate a light attenuating factor unlike the light attenuating factor calculating unit 60 according to the first to third embodiments, but determines the light attenuating factor ka quickly from the brightness expanding factor kg, for example, by evaluating Equation (5) described above. The processing load is therefore reduced, whereby the image display apparatus 1A can be formed of a simpler circuit configuration.

Each of the embodiments described above is presented only by way of exemplary specific aspect to which the invention is applied and hence does not limit the invention. The invention can alternatively be implemented in other aspects different from the embodiments described above. Each of the above embodiments has been described with reference to the configuration in which the image display apparatus 1 or 1A that projects right-eye image data and left-eye image data that form stereoscopic image data calculates a brightness expanding factor for performing brightness expanding, but the invention is not limited to the configuration described above. For example, the brightness expanding factor and the light attenuating factor may alternatively be calculated by a personal computer or any other image supply apparatus externally connected to the image display apparatus 1 or 1A. In this case, the image supply apparatus may be an apparatus having the functions of the image output unit 20, the characteristic value calculating unit 30, the brightness expanding factor calculating unit 40 or 41, the brightness expanding unit 50, the light attenuating factor calculating unit 60 or 61, and the light attenuating unit 70 accommodated in the image display apparatus 1 or 1A. In this configuration, the image display apparatus 1 or 1A may be any apparatus that projects an image inputted from the image supply apparatus on the screen SC, but preferably an apparatus having a function of controlling the light control element 120 in accordance with a light attenuating factor inputted from the image supply apparatus.

Further, in each of the embodiment described above, the image output unit 20 produces right-eye image data and left-eye image data from an inputted stereoscopic video signal and alternately outputs the right-eye image data and the left-eye image data, but the invention is not necessarily configured this way. For example, the brightness expanding unit 50 may alternately output the right-eye image data and the left-eye image data to the light valve 130. Further, each of the above embodiments has been described with reference to the configuration in which combined image data formed of right-eye image data and left-eye image data formatted by using the side-by-side scheme or the top-and-bottom scheme is separated into the right-eye image data and the left-eye image data by the image output unit 20. The separation may alternatively be carried out by the brightness expanding unit 50.

Moreover, image characteristic values calculated by the characteristic value calculating unit 30 are not limited to the white peak, the black peak, the APL, and the brightness histogram described above but may be other characteristic values. Further, specific aspects of the processes carried out by the brightness expanding factor calculating unit 40 or 41 and the light attenuating factor calculating unit 60 may be arbitrarily configured, and the detailed configuration of the image display apparatus 1 or 1A can be arbitrarily changed.

Further, the image display apparatus according to each of the embodiments of the invention is not limited to a projector that projects 3D (stereoscopic) video images on the screen SC as described above, but may be a variety of other display apparatus, such as a liquid crystal monitor or a liquid crystal television that displays 3D images/video images on a liquid crystal display panel, a monitor or a television receiver that displays 3D images/video images on a PDP (plasma display panel), or a monitor, a television receiver, or any other self-luminous display apparatus that displays 3D images/video images on an organic EL display panel called an OLED (organic light-emitting diode), an OEL (organic electro-luminescence) device, and other devices. In this case, the liquid crystal display panel, the plasma display panel, and the organic EL display panel correspond to the image display unit.

Further, the functional units in the image display apparatus 1 and 1A shown in FIGS. 1 and 8 show functional configurations of the image display apparatus and are not particularly limited to specific implementation forms. That is, hardware components corresponding to the functional units are not necessarily implemented separately, but it is, of course, possible to use a single processor that executes a program to achieve a plurality of functional units.

What is claimed is:

1. An image display apparatus comprising:
    a characteristic value calculating unit that calculates brightness-related image characteristic values of at least one of right-eye image data and left-eye image data that form stereoscopic image data;
    a expanding coefficient calculating unit that calculates a expanding coefficient common to the right-eye image data and the left-eye image data based on the image characteristic values calculated by the characteristic value calculating unit;
    a brightness expanding unit that performs brightness expanding on both the right-eye image data and the left-eye image data by using the expanding coefficient calculated by the expanding coefficient calculating unit; and
    an image display unit that displays an image based on the right-eye image data and the left-eye image data having undergone the brightness expanding.

2. The image display apparatus according to claim 1, further comprising a light control unit that attenuates light emitted from a light source in correspondence with the brightness expanding performed by the brightness expanding unit.

3. The image display apparatus according to claim 1, wherein the characteristic value calculating unit calculates image characteristic values from either the right-eye image data or the left-eye image data, and
    the expanding coefficient calculating unit determines a expanding coefficient based on the image characteristic values calculated from the chosen image data by the characteristic value calculating unit.

4. The image display apparatus according to claim 1, wherein the characteristic value calculating unit calculates image characteristic values of either the right-eye image data or the left-eye image data during a period over which the image data from which the characteristic value calculating unit calculates the image characteristic values is being outputted, the expanding coefficient calculating unit determines a expanding coefficient from the image characteristic values after the image data from which the characteristic value calculating unit has calculated the image characteristic values is outputted and during a period over which the other image data is being outputted, and the brightness expanding unit performs brightness expanding in synchronization with the timing when a frame following the image data from which the characteristic value calculating unit has calculated the image characteristic values starts being outputted.

5. The image display apparatus according to claim 1, wherein the characteristic value calculating unit calculates image characteristic values from both the right-eye image data and the left-eye image data, and the expanding coefficient calculating unit determines a expanding coefficient based on the image characteristic values calculated from both the image data by the characteristic value calculating unit.

6. The image display apparatus according to claim 5, wherein the characteristic value calculating unit calculates image characteristic values from both the right-eye image data and the left-eye image data but based on data in target areas set in the right-eye and left-eye image data, and the position of the target area in the right-eye image data and the position of the target area in the left-eye image data differ from each other.

7. An image display method comprising:

calculating brightness-related image characteristic values of at least one of right-eye image data and left-eye image data that form stereoscopic image data;

calculating a expanding coefficient common to the right-eye image data and the left-eye image data based on the calculated image characteristic values;

performing brightness expanding on both the right-eye image data and the left-eye image data by using the calculated expanding coefficient; and displaying an image based on the right-eye image data and the left-eye image data having undergone the brightness expanding.

8. An image supply apparatus comprising:

a characteristic value calculating unit that calculates brightness-related image characteristic values of at least one of right-eye image data and left-eye image data that form stereoscopic image data;

a expanding coefficient calculating unit that calculates a expanding coefficient common to the right-eye image data and the left-eye image data based on the image characteristic values calculated by the characteristic value calculating unit; and a brightness expanding unit that performs brightness expanding on both the right-eye image data and the left-eye image data, based on which an image is displayed, by using the expanding coefficient calculated by the expanding coefficient calculating unit.

* * * * *